June 22, 1943. A. ZEITLIN 2,322,498
MEANS FOR GENERATING BALANCING SIGNALS
Filed Jan. 7, 1942
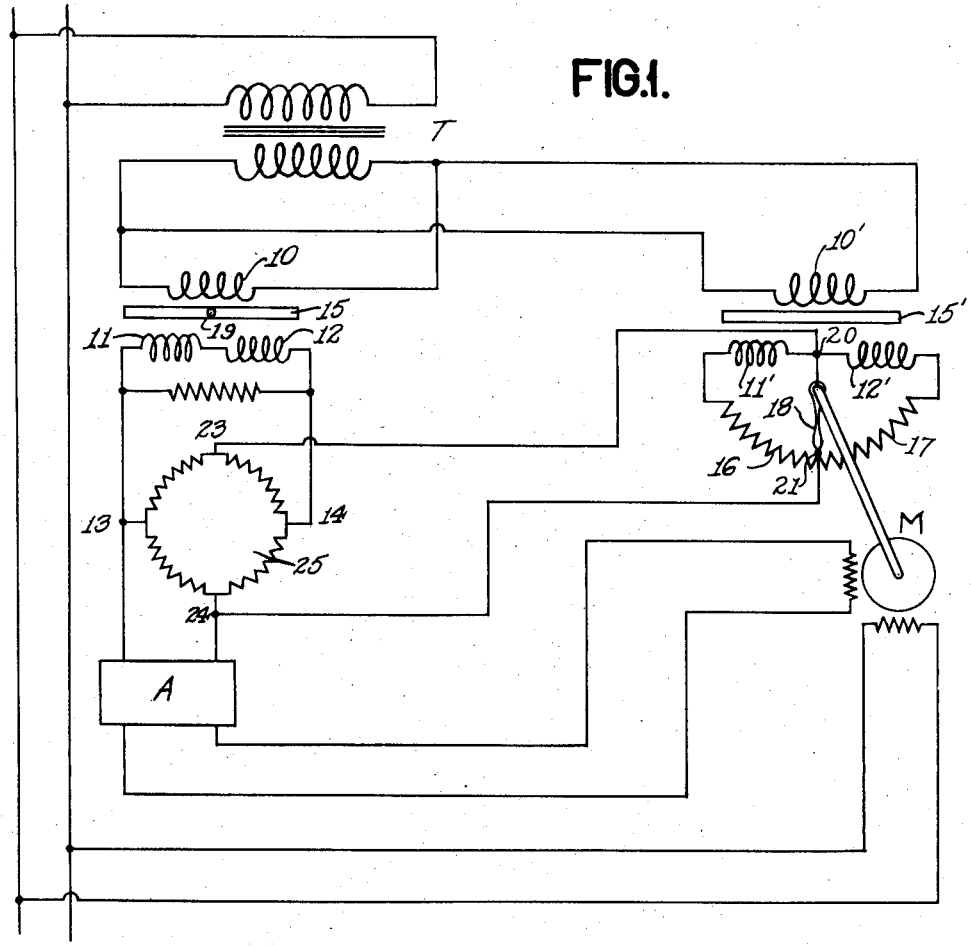
FIG.1.
FIG.3.
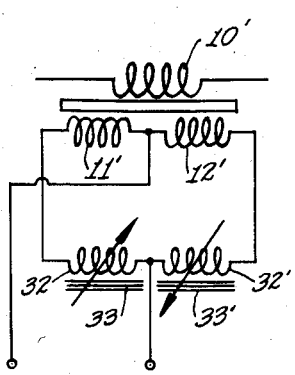
FIG.2.
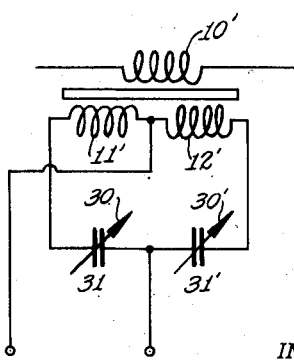
INVENTOR.
ALEXANDER ZEITLIN
BY Joseph H. Lipschutz
ATTORNEY Patented June 22, 1943

2,322,498

UNITED STATES PATENT OFFICE 2,322,498

MEANS FOR GENERATING BALANCING SIGNALS

Alexander Zeitlin, New York, N. Y., assignor, by mesne assignments, to Sperry Products, Inc., a corporation of New York Application January 7, 1942, Serial No. 425,946

8 Claims. (Cl. 172—239)

This invention relates to that type of apparatus wherein it is necessary to generate an A. C. electric impulse for the purpose of balancing a previously generated impulse. This arrangement is frequently found in indicating instruments wherein an A. C. electric impulse is generated in response to some variable such as pressure or length, and this impulse is utilized to set in motion means such as a motor for generating a balancing impulse which, when it reaches the magnitude of the first generated impulse, stops the motor. The degree of actuation of the motor is an indication of the magnitude of the variable being measured. Thus, for example, in connection with pressure gauges for rolling mills where the pressure between the rolls causes stretching of the frame, a measurement of the pressure or stress is obtained by causing the elongation in a portion of the mill frame stand to generate an electric impulse. This enters a mixing bridge, the output of which energizes a motor which operates to generate an opposing impulse which also enters the mixing bridge. The motor continues to operate and increase the magnitude of the balancing impulse until the balancing impulse equals the original generated impulse, at which time the output from the mixing bridge is zero and the motor stops. The degree of actuation of the motor gives an indication of the stress in the frame.

The problem presented in generating equal, opposing A. C. impulses arises from the fact that the opposing impulse must have the same amplitude, frequency, phase and wave form as the original impulse; otherwise an error results. One attempted solution of the problem thus described consisted in providing as the means for generating the original impulse, an A. C. circuit having a flux circuit including an air gap and a movable armature for varying the gap and hence for varying the reluctance of the A. C. circuit. The variable being measured is caused to control the movements of the armature and thus generate the original impulse which would then have a given amplitude, frequency, phase and wave form. In order to balance this impulse it was proposed to provide a flux circuit similar to the original flux circuit and having an air gap controlled by a similar movable armature. The two flux circuits were connected to the same source of A. C. and made of exactly the same electric characteristics; therefore the outputs would have the same frequency, phase and wave form. It was assumed that when the motor which was energized by the original impulse had actuated the armature of the balancing flux circuit through the same degree of movement as the original armature in the original flux circuit, the amplitude of the output would be the same as the amplitude of the original impulse and that thus all the conditions for the balancing impulse would have been realized, namely, equality of amplitude, frequency, phase and wave form. This, however, was not the case, because of the minute degree of actuation of the armatures in these flux circuits. For example, in the pressure gauge for rolling mills, the movement in such armature corresponding to the stretch in the mill stand frame is only on the order of about .0005 inch. If, now, it is observed that the balancing impulse must not deviate from the original impulse by more than one percent it will be readily understood that no mechanical control of the armature in the balancing flux circuit can be made fine enough.

The present invention seeks to solve the above problem by utilizing two flux circuits connected to the same source of A. C. energy and having the same electrical characteristics, as has been heretofore proposed, thus insuring the same frequency, phase and wave form of output. The variable to be measured controls the movements of the armature of the original flux circuit as heretofore, but instead of varying the air gap of the balancing flux circuit by moving an armature therein, as in the case of the original flux circuit, the output of the balancing flux circuit is controlled by varying either the resistance, capacity or inductance of the balancing flux circuit. By this method a very fine degree of control is obtained because much larger movements of the elements controlling these factors are necessary to obtain the same output impulse than in the case where the reluctance of the circuit is varied by the movements of an armature to vary an air gap. Thus, whereas in the case of a variable reluctance it would be necessary to move the armature .0005 inch to vary an air gap in order to obtain a given balancing impulse, it is necessary to move the contact arm over a potentiometer coil for a distance of one-half inch to obtain the same balancing output. This greater degree of movement allows for a much finer control. The same is true in the case where the balancing flux circuit is varied by the movement of condenser elements to vary the capacity or by the movement of a core to vary the inductance.

Further objects and advantages of this invention will become apparent in the following detailed description thereof.

In the accompanying drawing,

Fig. 1 is a view consisting largely of a wiring diagram illustrating the principles of the invention.

Fig. 2 is a wiring diagram of a modification of this invention utilizing variable capacity instead of resistance in the balancing circuit.

Fig. 3 is a wiring diagram of a modified form of the invention utilizing variable inductance in the balancing circuit.

Referring first to Fig. 1 of the drawing, I have shown an A. C. circuit in which there is a flux circuit having an air gap. For this purpose there is shown a source of A. C. which energizes the primary coil 10 of a transformer by way of transformer T connected to the A. C. source and which induces alternating current in secondary coils 11 and 12. An armature 15 is pivoted at 15' so as normally to provide equal air gaps between secondary coils 11 and 12 and said armature. When the armature is in its centralized position the primary coil 10 induces equal and opposite voltages in secondary coils 11 and 12. It will be appreciated that if armature 15 turns about its pivot 19 so as to increase the air gap between one of the coils 11 or 12 and said armature, and correspondingly decrease the air gap between the other of said coils and the armature, the reluctance of the two flux circuits through coils 11 and 12 will be varied oppositely so that the voltage induced in one will be greater than the voltage induced in the other.

Since coils 11 and 12 are of equal inductance and oppositely wound, no impulse will be taken off leads 13 and 14 when the armature 15 is in its central position with equal air gaps between the coils 11 and 12. The armature 15, however, is connected to some element whose movements are to be measured or indicated, as, for instance, the frame of a rolling mill stand in which the elongation of the frame is a measure of the stress between the pressure rolls. The elongation of the frame will, therefore, by reason of its connection to armature 15 tilt the armature about its pivot 19 to increase the air gap between the armature and one of the coils 11, 12 and decrease the air gap between the armature and the other coil. This will generate an A. C. impulse at terminals 13, 14.

This impulse is of a magnitude dependent upon the degree of actuation of armature 15 and of a frequency, phase and wave form dependent upon the source of A. C. energy and the electrical characteristics of the transformer 10, 11, 12, 15 and its circuit. This impulse from terminals 13, 14 is caused to enter a mixing bridge 25 and the output from said bridge, after being duly amplified by amplifier A, may be caused to operate a motor M. The motor M, in turn, is caused to operate mechanism in the nature of a follow-up which will generate a balancing impulse which will be caused to enter the mixing bridge 25 and when the balancing impulse is equal in amplitude and of the same frequency, phase and wave form as the original impulse generated at terminals 23 and 24, the output from the mixing bridge will be zero and the motor M will stop. The degree of actuation of motor M, as indicated by movement of pointer 18 actuated by said motor, is the measure of actuation of armature 15. This in turn will be the measure of the factor under consideration which is actuating the armature 15, such as the stress in a rolling mill stand or similar variable factor. As set forth in the introduction hereto, the problem consists in generating a balancing impulse which shall have the same amplitude and be of the same frequency, phase and wave form as the original impulse. If any of these characteristics differ from that of the original impulse, there will be an error in the degree of actuation of motor M and hence in the measurement which is being indicated.

In order that the balancing impulse shall be of the same frequency as the original impulse, means may be provided for generating the balancing impulse which will derive its energization from the same source of A. C. power as the responsive circuit which generated the original impulse. In order that the balancing impulse shall also have the same phase and wave form as the original impulse, there may be provided a similar primary coil 10' energized from transformer T and which induces A. C. impulses in a pair of secondary coils 11' and 12' of equal inductance and connected in opposition. An armature 15' may be provided to give the same air gaps between said armature and coils 11' and 12' as in the responsive element. It will be noted that the balancing element is thus made electrically the same in every respect to the responsive element, and since it is connected to the same source of A. C. energy, the output from the system must necessarily be of the same frequency, phase and wave form as the output from the responsive element.

Since the movements of the armature 15 are very small, as pointed out in the introduction where it was stated that in the case of a pressure mill stand the movement to be measured was only of the order of .0005 inch, this invention does not attempt to generate a balancing impulse of the same amplitude as the original impulse generated by the responsive element by moving the armature 15' around a pivot to vary the air gaps between it and the coils 11' and 12'. That is to say, this invention does not seek to generate a balancing impulse by varying the reluctance of the A. C. circuit in which the coils 11' and 12' are contained, since extremely small variations in air gap, i. e., in reluctance, produce large variations in output. Instead, this invention may vary any one of several other factors in the circuit of said coils 11' and 12'.

Thus, for instance, there is shown in Fig. 1 a method by which the balancing impulse is generated by varying the resistance in the circuit of coils 11' and 12'. For this purpose the said coils are formed as two arms of a Wheatstone bridge, the other two arms of which are the parts 16 and 17 of a potentiometer coil over which the potentiometer contact 18 operates. The contact 18 is normally so positioned that there is no voltage at points 20 and 21 representing mid-points of the bridge. Therefore no voltage appears at terminals 23 and 24. The armature 15' remains fixed and is not pivoted, so that the reluctance of the circuit of coils 11' and 12' is not varied when the coils 11 and 12 generate an A. C. impulse by reason of the pivotal movement of the armature 15. This impulse energizes motor M as hereinbefore described, which then operates the potentiometer contact 18 in such direction as to generate an impulse by reason of the unbalancing of the Wheatstone bridge. This impulse tends to increase as contact 18 continues to move in a direction further to unbalance the bridge until the impulse generated at terminals 23 and 24, after entering the mixing bridge 25, is sufficient to counterbalance the impulse generated by coils 11 and 12 which enters the mixing bridge at 13, 14. At this point the output of the mixing bridge is zero and the motor will stop. The degree of actuation of the motor, which may be the degree of actuation of potentiometer contact or pointer 18, is a measure of the degree of actuation of armature 15 and hence an indication of the variable being measured.

It will be seen that in the Fig. 1 form of the invention the impulse generated by movement of armature 15 has been balanced by an impulse generated in the A. C. circuit which includes coils 11' and 12', not by varying the air gap between armature 15' and said coils, which would vary the reluctance of the circuit, but rather by varying the resistance in the A. C. circuit of said coils. The result of this construction is that whereas minute movements of armature 15', and therefore small variations in reluctance, would yield large variations in output and therefore make it almost impossible to generate a balancing impulse of the extremely small magnitude desired and with the requisite degree of accuracy, the present method of varying the resistance of the circuit makes it possible to get an extremely fine control. This is due to the fact that it takes a relatively large variation in resistance to yield the same variation in output as would be caused by a relatively minute variation in reluctance. Thus, instead of the .0005 inch movement of the armature, the characteristics of the potentiometer coil and the circuit may be designed so that a full half inch movement of the potentiometer contact 18 may be necessary to give the equivalent output. Thus a much finer degree of accuracy and control is obtainable.

In a modified form of the invention disclosed in Fig. 2, I may vary, instead of the resistance, the capacity of the circuit which includes the coils 11' and 12'. Thus the motor M, instead of moving the potentiometer contact 18, may be caused to move the movable elements 30 and 30' of condensers 31 and 31', said condensers forming the two ratio arms of the Wheatstone bridge shown in Fig. 1.

Similarly, in Fig. 3, instead of varying the resistance or the capacity of the A. C. circuit in which coils 11' and 12' are included, I may vary the inductance of said circuit, and hence have shown two inductances 32 and 32' forming the ratio arms of the Wheatstone bridge and having their inductances variable by causing the motor M to operate cores 33 and 33' of said inductances. In both forms of the invention shown in Figs. 2 and 3 the same applies as in Fig. 1, namely, that relatively large movements would be necessary to unbalance the A. C. circuit sufficiently to generate balancing impulses equal in amplitude to those generated in the responsive element by the relatively small movements of armature 15. Thus, by any of the arrangements shown in Figs. 1, 2 and 3 there is obtained the desirable result that a balancing impulse is provided which is not only of the same frequency, phase and wave form as the original impulse generated by the responsive element, but whose amplitude can be controlled to within very fine degrees so as to make certain that the amplitude of the balancing impulse is exactly the same as that of the original impulse generated by the responsive element. In the forms shown in Figs. 1, 2 and 3, the greater accuracy is possible by reason of the fact that a greater variation in resistance, impedance or inductance is necessary to produce the same impulse as the relatively small movement in case of variation in reluctance. The desirable results of this invention are therefore accomplished by varying any impedance factor of the balancing circuit other than reluctance, while maintaining all other characteristics of the balancing and responsive circuits the same, including the same source of A. C. energization.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device of the type described, a responsive member movable as a function of a variable, an A. C. circuit energized by a source of A. C. energy, means whereby said responsive means varies the reluctance of said circuit to generate an A. C. impulse, and means for generating a balancing impulse of equal magnitude and the same frequency, phase and wave form, said last-named means comprising an A. C. circuit having the same electrical characteristics and energized by the same source of energy as said first circuit, said second A. C. circuit comprising a plurality of impedances normally arranged so that no impulse is generated thereby, means whereby said first named impulse varies the relationship of any of the impedance factors of said second circuit other than reluctance, means whereby variation of any of said last named factors generates a balancing impulse of increasing magnitude of amplitude until said balancing impulse equals said first named impulse, and means for opposing said impulses.

2. In a device of the type described, a responsive member movable as a function of a variable, an A. C. circuit energized by a source of A. C. energy, means whereby said responsive means varies the reluctance of said circuit to generate an A. C. impulse, and means for generating a balancing impulse of equal magnitude and the same frequency, phase and wave form, said last-named means comprising an A. C. circuit having the same electrical characteristics and energized by the same source of energy as said first circuit, said second A. C. circuit comprising a plurality of resistances normally arranged so that no impulse is generated thereby, means whereby said first named impulse varies the relationship of said resistances, means whereby variation of the relationship of said resistances generates a balancing impulse of increasing magnitude of amplitude until said balancing impulse equals said first named impulse, and means for opposing said impulses.

3. In a device of the type described, a responsive member movable as a function of a variable, an A. C. circuit energized by a source of A. C. energy, means whereby said responsive means varies the reluctance of said circuit to generate an A. C. impulse, and means for generating a balancing impulse of equal magnitude and the same frequency, phase and wave form, said last-named means comprising an A. C. circuit having the same electrical characteristics and energized by the same source of energy as said first circuit, said second A. C. circuit comprising a plurality of capacity elements normally arranged so that no impulse is generated thereby, means whereby said first named impulse varies the relationship of said elements, means whereby variation of the relationship of said elements generates a balancing impulse of increasing magnitude of amplitude until said balancing impulse equals said first named impulse, and means for opposing said impulses.

4. In a device of the type described, a responsive member movable as a function of a variable, an A. C. circuit energized by a source of A. C. energy, means whereby said responsive means varies the reluctance of said circuit to generate an A. C. impulse, and means for generating a balancing impulse of equal magnitude and the same frequency, phase and wave form, said last named means comprising an A. C. circuit having the same electrical characteristics and energized by the same source of energy as said first circuit, said second A. C. circuit comprising a plurality of inductances normally arranged so that no impulse is generated thereby, means whereby said first named impulse varies the relationship of said inductances, means whereby variation of the relationship of said inductances generates a balancing impulse of increasing magnitude of amplitude until said balancing impulse equals said first named impulse, and means for opposing said impulses.

5. In a device of the type described, a responsive member movable as a function of a variable, an A. C. circuit energized by a source of A. C. energy and including a flux circuit having an air gap, means whereby said responsive means varies said air gap to vary the reluctance of said circuit and generate an A. C. impulse, and means for generating a balancing impulse of equal magnitude and the same frequency, phase and wave form, said last named means comprising an A. C. circuit having the same electrical characteristics including a flux circuit and an air gap and energized by the same source of energy as said first circuit, said second A. C. circuit comprising a plurality of impedances normally arranged so that no impulse is generated thereby, means whereby said first named impulse varies the relationship of any of the impedance factors of said second circuit other than reluctance, means whereby variation of any of said last named factors generates a balancing impulse of increasing magnitude of amplitude until said balancing impulse equals said first named impulse, and means for opposing said impulses.

6. In a device of the type described, a responsive member movable as a function of a variable, an A. C. circuit energized by a source of A. C. energy and including a flux circuit having an air gap, means whereby said responsive means varies said air gap to vary the reluctance of said circuit and generate an A. C. impulse, and means for generating a balancing impulse of equal magnitude and the same frequency, phase and wave form, said last named means comprising an A. C. circuit having the same electrical characteristics including a flux circuit and an air gap and energized by the same source of energy as said first circuit, said second A. C. circuit comprising a plurality of resistances normally arranged so that no impulse is generated thereby, means whereby said first named impulse varies the relationship of said resistances, means whereby variation of the relationship of said resistances generates a balancing impulse of increasing magnitude of amplitude until said balancing impulse equals said first named impulse, and means for opposing said impulses.

7. In a device of the type described, a responsive member movable as a function of a variable, an A. C. circuit energized by a source of A. C. energy and including a flux circuit having an air gap, means whereby said responsive means varies said air gap to vary the reluctance of said circuit and generate an A. C. impulse, and means for generating a balancing impulse of equal magnitude and the same frequency, phase and wave form, said last named means comprising an A. C. circuit having the same electrical characteristics including a flux circuit and an air gap and energized by the same source of energy as said first circuit, said second A. C. circuit comprising a plurality of capacity elements normally arranged so that no impulse is generated thereby, means whereby said first named impulse varies the relationship of said elements, means whereby variation of the relationship of said elements generates a balancing impulse of increasing magnitude of amplitude until said balancing impulse equals said first named impulse, and means for opposing said impulses.

8. In a device of the type described, a responsive member movable as a function of a variable, an A. C. circuit energized by a source of A. C. energy and including a flux circuit having an air gap, means whereby said responsive means varies said air gap to vary the reluctance of said circuit and generate an A. C. impulse, and means for generating a balancing impulse of equal magnitude and the same frequency, phase and wave form, said last named means comprising an A. C. circuit having the same electrical characteristics including a flux circuit and an air gap and energized by the same source of energy as said first circuit, said second A. C. circuit comprising a plurality of inductances normally arranged so that no impulse is generated thereby, means whereby said first named impulse varies the relationship of said inductances, means whereby variation of the relationship of said inductances generates a balancing impulse of increasing magnitude of amplitude until said balancing impulse equals said first named impulse, and means for opposing said impulses.

ALEXANDER ZEITLIN.